(12) United States Patent
Miller et al.

(10) Patent No.: US 10,245,808 B2
(45) Date of Patent: Apr. 2, 2019

(54) MULTI-LAYERED FUNCTIONAL FABRIC AND ARTICLES

(71) Applicant: Halo2Cloud, LLC, Glastonbury, CT (US)

(72) Inventors: Garold C. Miller, Glastonbury, CT (US); Nathan Daniel Weinstein, Glastonbury, CT (US)

(73) Assignee: Halo International SEZC Ltd., Georgetown (KY)

( * ) Notice: Subject to any disclaimer, the term of this patent is extended or adjusted under 35 U.S.C. 154(b) by 458 days.

(21) Appl. No.: 14/938,933

(22) Filed: Nov. 12, 2015

(65) Prior Publication Data

US 2017/0086523 A1     Mar. 30, 2017

Related U.S. Application Data

(60) Provisional application No. 62/232,013, filed on Sep. 24, 2015.

(51) Int. Cl.
| | |
|---|---|
| B32B 5/02 | (2006.01) |
| A45F 3/02 | (2006.01) |
| A45F 3/04 | (2006.01) |
| A45C 3/00 | (2006.01) |
| A45C 3/02 | (2006.01) |
| D04H 1/559 | (2012.01) |
| A41D 31/00 | (2019.01) |

(52) U.S. Cl.
CPC .............. *B32B 5/024* (2013.01); *A45C 3/001* (2013.01); *A45C 3/02* (2013.01); *A45F 3/02* (2013.01); *A45F 3/04* (2013.01); *B32B 5/022* (2013.01); *D04H 1/559* (2013.01); *A41D 31/0044* (2013.01); *B32B 2307/56* (2013.01); *B32B 2307/73* (2013.01); *B32B 2437/00* (2013.01)

(58) Field of Classification Search
CPC ..... B32B 5/024; B32B 5/022; B32B 2307/56; B32B 2437/00; B32B 2307/73; A45F 3/02; A45F 3/04; A45C 3/001; A45C 3/02; D04H 1/559; A41D 31/0044
See application file for complete search history.

(56) References Cited

U.S. PATENT DOCUMENTS

| | | | |
|---|---|---|---|
| 2005/0092504 A1* | 5/2005 | Walthall | G06F 1/182 |
| | | | 174/394 |
| 2005/0191918 A1* | 9/2005 | Langley | B32B 27/08 |
| | | | 442/59 |
| 2010/0230018 A1* | 9/2010 | Nielsen | A45C 13/185 |
| | | | 150/102 |

* cited by examiner

*Primary Examiner* — Cephia D Toomer
(74) *Attorney, Agent, or Firm* — McCormick, Paulding & Huber LLP

(57) ABSTRACT

A laminated fabric article includes a first layer of shock absorbing visco-elastic fabric; a second layer of electromagnetic barrier metallized fabric; and a third layer of moisture barrier hydrophobic coated fabric. The fabric article also may include a fourth layer of shape-memory fabric. The article may be formed as a container or as a garment or a portion of a garment.

19 Claims, 2 Drawing Sheets

MULTI-LAYERED FUNCTIONAL FABRIC AND ARTICLES

CROSS REFERENCE TO RELATED APPLICATION

This application is a non-provisional of and claims the benefit of U.S. Provisional Application No. 62/232,013, filed Sep. 24, 2015, which is incorporated herein by reference.

BACKGROUND

Technical Field

The present invention relates generally to fabric, and, more particularly, to containers and garments built from functional fabrics.

Discussion of Art

Functional fabrics denote flaccid or elastic web materials (woven or non-woven) that incorporate or embody functionality beyond simply forming and covering an article. For example, a fabric with embedded fluorescent or phosphorescent particles, which augment a wearer's visibility in low-light conditions, would be a functional fabric.

With the increased use of electronic devices, there is an increased need for functional fabrics that are useful with reference to such devices, and especially for the safe transport and storage of such devices. Some particular obstacles to the use and transport of electronic devices can be overcome by developing functional fabrics to meet those obstacles. Certain obstacles include moisture, heat, radio-frequency scanning exploits ("electronic pick pocketing"), physical impact damage, or loss of a device by its dislodgment from a carrying receptacle.

In view of the foregoing, there is a need for a functional fabric that can be used to protect portable electronic devices in transport and storage from everyday hazards. Accordingly, it is a general object of the present invention to provide a functional fabric that improves upon conventional fabrics being used for bags, purses, briefcases, luggage and the like, as well as for clothing, and that overcomes the problems and drawbacks associated with such conventional fabrics, with a particular focus on protecting portable electronic devices from moisture, over-heating, physical impact damage and electronic pick-pocketing.

SUMMARY OF INVENTION

In accordance with the present invention, embodiments of the invention provide a multi-layered functional fabric that addresses obstacles to use and transport of electronic devices. Particularly, the functional fabric incorporates at least a moisture-protective layer, a shock-protective layer, and a radio-frequency (RF)-protective layer. Optionally, the functional fabric may also incorporate an appearance layer and a shape-memory layer. The shape-memory layer, in addition to its basic material properties, also may incorporate heat-dissipating fiber technology. At least the edges of the protective layers are fastened together, e.g., by adhesive, stitching, melt-bonding, or other means. The entire areas or substantially the entire areas of the protective layers also can be fastened to each other, e.g., by adhesive, melt-bonding, etc. The appearance layer and the shape-memory layer also are fastened at least at their edges to the protective layers, preferably to form a pocket or enclosure for receiving a device.

The multi-layer functional fabric can be incorporated into a fashion accessory or container (e.g., a bag, purse, briefcase, luggage or the like) or into a garment (e.g., a jacket, sweatshirt, pants or the like) or a portion of a garment. The multi-layer functional fabric provides a protective solution for securely transporting and storing electronic devices in any accessory safely and fashionably. The fabric of the present invention shields electronic devices from everyday obstacles including moisture, electronic pick pocketing, overheating, and physical impacts or drops.

The multi-layer functional fabric can shield electronic devices from physical shock impacts or drops through use of elastomeric shock technology within the shock-protective layer. For example, the shock-protective layer may incorporate visco-elastic polymer strands. Accordingly, the shock-protective layer helps to prevent glass screens or circuit board connections from breaking by absorbing drop impacts before the damage ever makes its way to a device.

The multi-layer functional fabric can shield electronic devices from moisture through use of exceptional water resistant barrier technology within the moisture-protective layer. For example, the moisture-protective layer may include a non-woven polymer fabric such as nylon or polyethylene.

The multi-layer functional fabric can shield electronic devices from electronic pick pocketing through use of RFID barrier technology within the RF-protective layer. For example, the RF-protective layer may incorporate an electromagnetically conductive (high permittivity) material such as stainless steel or copper or aluminum mesh, any of which can dissipate and diffract radio waves so as to thwart electronic pick pockets. Thus, by using the special RF-blocking material strategically woven into the fabric, the RF-protective layer prevents any attempt of electronic pick pocketing.

The multi-layer functional fabric can help to retain electronic devices in an accessory or garment receptacle by use of the shape-memory layer. For example, the shape-memory layer may incorporate a one of a kind memory elastomer material, formed into a mesh that molds and re-molds over and over again to fit the shape of a contained device.

The shape-memory layer may incorporate a unique cooling system that helps to dissipate heat from a contained device. For example, the shape-memory layer may incorporate metallic fibers in addition to having holes for air flow. Accordingly, the shape memory layer can rapidly absorb and dissipate heat from cell phone batteries or the like.

The appearance layer may provide the look of leather, cloth, sequins, etc.

A bag or garment that incorporates the multi-layered functional fabric can provide secure carriage and storage of an electronic device, snugly protected from damage by moisture or impact. Additionally, such a bag or garment can comprehensively protect a carried electronic device from radio-frequency scanning or snooping (electronic pick pocketing). Thus, the multi-layered functional fabric provides new purpose and utility for bags or garments.

Thus, according to embodiments of the invention, a laminated fabric article includes a first layer of shock absorbing visco-elastic fabric; a second layer of electromagnetic barrier metallized fabric; and a third layer of moisture barrier hydrophobic coated fabric. The fabric article also may include a fourth layer of shape-memory fabric. The article may be formed as a container or as a garment or a portion of a garment.

Certain exemplary embodiments of the invention, as briefly described above, are illustrated by the following figures.

DETAILED DESCRIPTION

Figure 1:
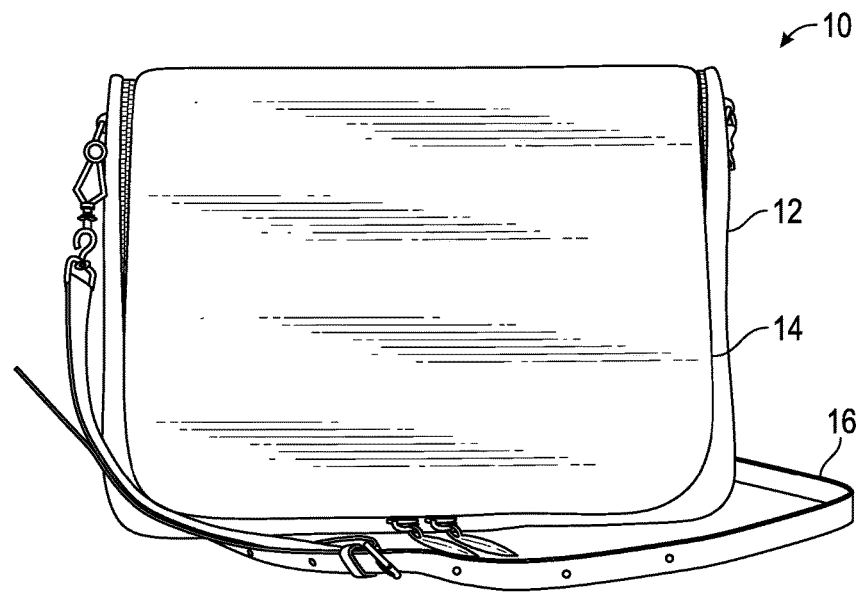
FIG. 1 shows a crossbody sleeve with zipper flap, in accordance with a first embodiment of the present invention.

Referring to FIG. 1, an accessory 10 (namely, a crossbody sleeve) incorporates a body 12, a zipper flap 14, and a strap 16. The strap is detachable and optional and is not required as an aspect of the invention. The flap 14 is shown with a zipper closure but may equally have strap, buckle, button, clasp, or magnetic closure. The accessory 10 may be any type of accessory, e.g, a handbag, a clutch, a wallet, a briefcase, an envelope, a portfolio, a shoulder bag, a purse, a pouch, a mini, a backpack, a duffel, luggage or the like. The present invention is more particularly directed to a functional fabric from which all or a part of the accessory 10 can be made to hold and protect one ore more portable electronic devices from everyday use hazards.

Figure 2:
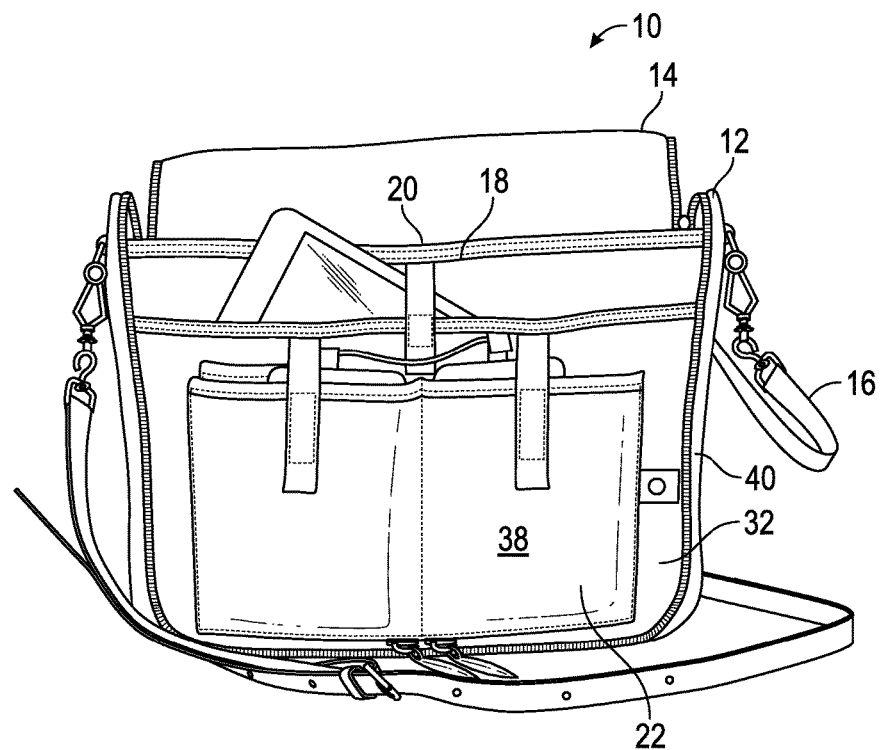
FIG. 2 shows the crossbody sleeve of FIG. 1, in an open condition, illustrating pockets or compartments for storing portable electronic devices therein.

Referring to FIG. 2, the body 12 houses compartments 18 (which are defined by dividers 20) as well as pockets 22 (which are attached to one of the dividers 20). The flap 14 completely covers or encloses the compartments 18 and the pockets 20 in its closed condition. In its open condition the flap 14 reveals the compartments and pockets for access to electronic devices held therein.

Figure 3:
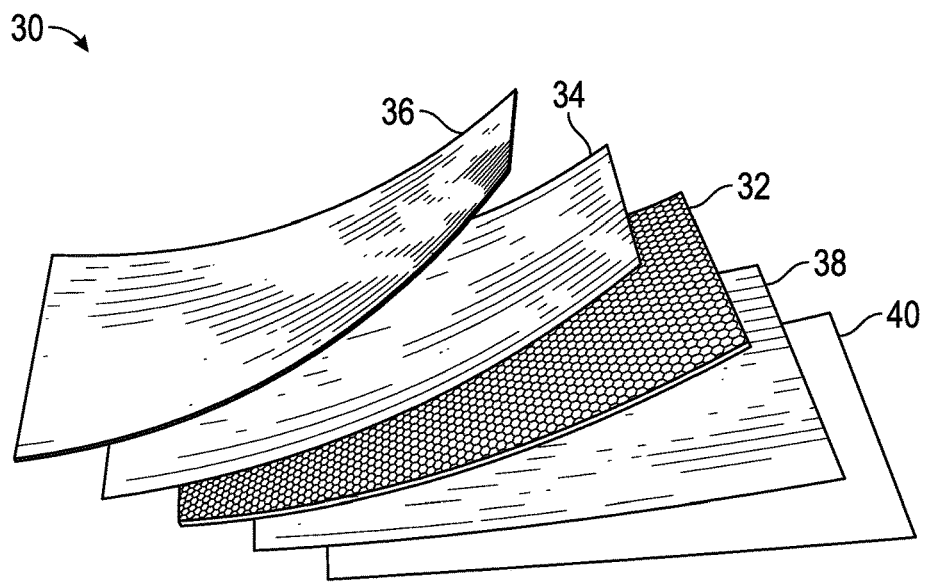
FIG. 3 shows layers of a multi-layer functional fabric used to construct the crossbody sleeve of FIGS. 1 and 2 in accordance with preferred embodiments of the present invention.

Referring further to FIG. 3, the body 12 and the dividers 20 are laminated fabric articles, which are built of a multi-layer functional fabric 30 in accordance with the present invention, or which incorporate the fabric 30 as a lining. The multi-layer functional fabric 30 incorporates a shock-protective layer 32, which may incorporate visco-elastic polymer strands. The multi-layer functional fabric 30 also incorporates a moisture-protective layer 34 and an electromagnetic (RF)-protective layer 36.

The shock-protective layer 32 may incorporate visco-elastic polymer strands. Accordingly, the shock-protective layer helps to prevent glass screens or circuit board connections from breaking by absorbing drop impacts before the damage ever makes its way to a device.

The moisture-protective layer 34 may include a non-woven polymer fabric such as nylon or polyethylene.

The RF-protective layer 36 may incorporate an electromagnetically conductive (high permittivity) material such as stainless steel or copper or aluminum mesh, any of which can dissipate and diffract radio waves so as to thwart electronic pick pockets. Thus, by using the special RF-blocking material strategically woven into the fabric, the RF-protective layer prevents any attempt of electronic pick pocketing.

In order to accommodate stretch and recuperation of the shock-protective layer 32, the moisture-protective layer 34 and the electromagnetic-protective layer 36 may have unstrained areas larger than an unstrained area of the shock-protective layer. Thus, in an unstrained state the shock-protective layer 32 may appear taut whereas the other layers 34, 36 may appear baggy or saggy. These three layers are present in each of the compartment dividers 20 in the illustrated embodiment of FIG. 2.

In preferred embodiments, the pockets 22 further include a shape-memory fabric, which also may be incorporated into the multi-layer functional fabric 30 as a shape-memory layer 38. The shape-memory layer 38 may incorporate a one of a kind memory elastomer material, formed into a mesh that molds and re-molds over and over again to fit the shape of a contained device. The shape-memory layer 38 also may incorporate a unique cooling system that helps to dissipate heat from a contained device. For example, the shape-memory layer 38 may incorporate metallic fibers, which further assists in dissipating heat from the device when in use or being charged while carried in the pocket 22. The metallic fibers may be microfibers, i.e. of lengths between one and one thousand micrometers. The metallic fibers may also be nanofibers, i.e., of lengths between one and one thousand nanometers. Thus, the shape memory layer 38 can rapidly absorb and dissipate heat from cell phone batteries or the like.

The outside of the body 12 and of the flap 14 incorporate (in addition to the shock-protective, moisture-protective, and RF-protective layers) an appearance layer 40. The appearance layer 40 may be cloth, leather, plastic, etc. and may provide the look of cloth, leather, sequins, etc.

Figure 4:
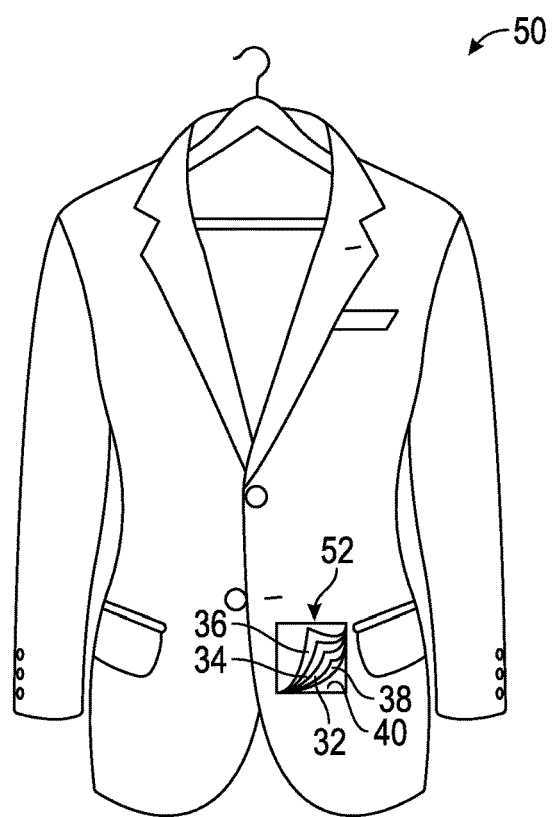
FIG. 4 shows a garment incorporating the multi-layer functional fabric of FIG. 3 in accordance with another embodiment of the present invention.

FIG. 4 illustrates a garment 50 (e.g., a blazer or suit jacket) that incorporates the multi-layer functional fabric of FIG. 3. In particular, the garment 50 includes a pocket 52 that comprises at its outside the appearance layer 40, the shock-protective layer 32, the moisture-protective layer 34, as well as the RF-protective layer 36. At least the shock-protective layer 30, the moisture-protective layer 34, and the RF-protective layer 36 are provided as both inside and outside linings of the pocket 52. Thus, the pocket 52 can offer double-sided or all round protection for an electronic device to be carried in the pocket. The garment 50 alternatively may be another item of apparel, e.g., pants, sweater, sweatshirt or the like. The pocket 52 alternatively can be an internal pocket that is defined by a patch of the shape-memory layer 38. In this case the shape-memory layer 38 will be attached to the other three layers only at its edges and will have an edge that is not attached in order to allow for insertion and removal an electronic device into the pocket 52.

By incorporating the multi-layer functional fabric 30 of the present invention, the garment 50 or the accessory 10 can provide enhanced protection and portability for electronic devices. In particular, the various layers of the fabric 30 enable garments or bags to protect electronic devices from obstacles such as moisture, radio-frequency snooping, and impact. Additionally, the shape-memory fabric 38 can be incorporated into the multi-layer functional fabric 30 so as to provide secure and form-fitting carriage of an electronic device as well as facilitating heat dissipation from any device while stored in the pocket.

Although exemplary embodiments of the invention have been described with reference to attached drawings, those skilled in the art nevertheless will apprehend variations in form or detail that are consistent with the scope of the invention.

What is claimed is:

1. A laminated fabric article comprising:
   a first layer of shock absorbing visco-elastic fabric;
   a second layer of electromagnetic barrier metallized fabric; and a third layer of moisture barrier hydrophobic coated fabric;

wherein the second layer and the third layer have unstrained areas larger than an unstrained area of the first layer, and are substantially delaminated from the first layer except at their edges.

2. A laminated fabric article comprising:
a first layer of shock absorbing visco-elastic fabric;
a second layer of electromagnetic barrier metallized fabric;
a third layer of moisture barrier hydrophobic coated fabric; and
a fourth layer of shape memory fabric.

3. The article of claim 2, wherein the second layer is adjacent the first layer and adjacent the third layer.

4. The article of claim 2, wherein the first layer is adjacent the second layer and adjacent the third layer.

5. The article of claim 2, wherein the first, second, and third layers are substantially coextensive.

6. The article of claim 2, wherein the fourth layer of shape memory fabric comprises metallic fibers.

7. The article of claim 6, wherein the metallic fibers are microfibers.

8. The article of claim 2, wherein the first, second, third, and fourth layers are substantially coextensive.

9. The article of claim 2, wherein the fourth layer is substantially delaminated from the first, second, and third layers except at its edges.

10. The article of claim 2, wherein the fourth layer is nonwoven mesh.

11. The article of claim 2, wherein at least one of the first, second, or third layers is woven.

12. The article of claim 2, wherein each of the first, second, and third layers is nonwoven.

13. A container comprising a laminated fabric, said laminated fabric comprising:
a first layer of shock absorbing visco-elastic fabric;
a second layer of electromagnetic barrier metallized fabric;
a third layer of moisture barrier hydrophobic coated fabric; and
a fourth layer of shape memory fabric.

14. The container of claim 13, wherein the container is a handbag.

15. The container of claim 13, wherein the container is a pouch or envelope.

16. The container of claim 13, wherein the container is a backpack.

17. The container of claim 13, wherein the container is a pocket of a garment.

18. A garment comprising a laminated fabric, said laminated fabric comprising:
a first layer of shock absorbing visco-elastic fabric;
a second layer of electromagnetic barrier metallized fabric;
a third layer of moisture barrier hydrophobic coated fabric; and
a fourth layer of shape memory fabric.

19. The garment of claim 18 wherein the fourth layer is attached to the first, second, and third layers only at its edges and forms an internal pocket of the garment.

* * * * *